Feb. 12, 1952

L. K. ROGACKI 2,585,038

TOOL

Filed Dec. 12, 1950

INVENTOR
LESTER K. ROGACKI
BY
his ATTORNEY.

Patented Feb. 12, 1952

2,585,038

UNITED STATES PATENT OFFICE 2,585,038

TOOL

Lester K. Rogacki, Huntington Station, N. Y., assignor to The Sperry Corporation, a corporation of Delaware Application December 12, 1950, Serial No. 200,376

7 Claims. (Cl. 77—58)

My invention relates generally to machine tools and has reference more particularly to a recessing tool or grooving tool for machining precision recesses or grooves of various diameters and depths with a minimum of change-over expense.

One of the principal objects of my invention resides in the provision of a tool which will form a recess or groove of small diameter deep within a part with the cutter well supported against thrust or chatter at a point closely adjacent to the cutting edge.

Another object of my invention is to provide a tool of the above character which may be employed immediately after the boring operation while the part remains firmly supported in its boring jig thereby eliminating the necessity of removing the part from the jig to perform the grooving operation.

Still another object of my invention resides in the provision of a tool of the above character in which the axial location of the groove within a bore may be readily adjusted by means within the body of the tool itself.

A further object resides in the provision of a tool of the above character in which the cutter is supported in a pilot member having firm cutter supporting bearings not only at the upper end of the shank portion thereof but also at the lower end of the shank closely adjacent to the cutting portion.

Other objects and advantages of my invention will become more apparent as a detailed description thereof proceeds. I have illustrated in the accompanying drawings a preferred embodiment of my invention in which.

Figure 1:
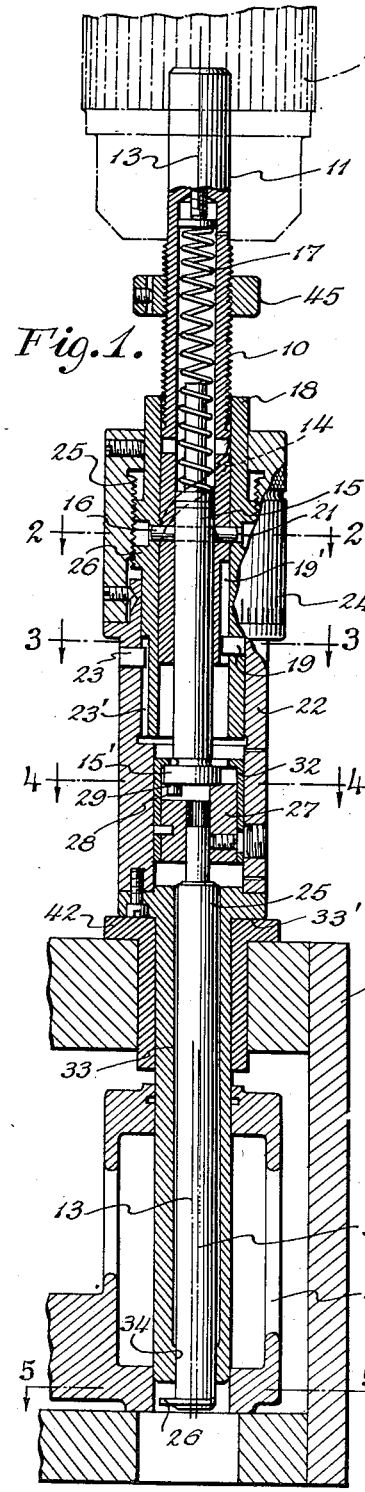
Fig. 1 is a vertical section of the grooving tool.
Figure 2:
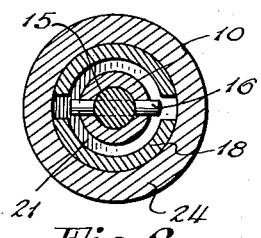
Figs. 2, 3, 4 and 5 are longitudinal sectional views of the tool taken along lines 2—2, 3—3, 4—4, 5—5, respectively, of Fig. 1.
Figure 3:
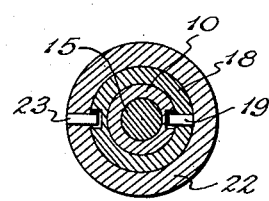
Figure 4:
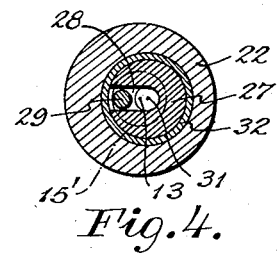

Referring now particularly to Figs. 1 through 5, the reference character 10 indicates a first or inner cylindrical sleeve having a shank portion 11 at its upper end adapted to be chucked in the driving chuck 12 of a drill press or lathe by which the entire tool is rotated about a tool axis 13. The cylindrical sleeve 10 is provided with a helical slot 14 which is cut through the sleeve 10. Slidably and rotatably fitted within the sleeve 10 is a drive shaft 15 having a pin 16 fixed adjacent its upper end which is long enough to extend through the slot 14 in the cylindrical sleeve 10. Thus, when the cylindrical sleeve 10 is displaced axially relative to the shaft 15, the helical slot 14 will cause rotation of the shaft 15 about the tool axis 13. A compression spring 17 is provided between the upper end of the shaft 15 and the cylindrical sleeve 10 for resisting axial movement of the sleeve 10 for a purpose to be hereinafter more fully described.

The first cylindrical sleeve 10 is adapted to slide within a second concentric sleeve 18 to which it is keyed, as by key 19, so that as the first sleeve 10 is rotated, the second sleeve 18 will be rotated thereby. The key 19 cooperates with a slot 19' in sleeve 10 so that the latter may be axially moved relative to sleeve 18. This second sleeve 18 is provided with an annular internal groove 21 (Fig. 2) which is adapted to receive the protruding ends of the pin 16. Through such a construction, the second sleeve 18 is maintained in the same axial position as the shaft 15, but at the same time will permit rotation of the drive shaft 15 relative thereto.

The second cylindrical sleeve 18 is arranged to be axially positioned within an outer sleeve 22 to which it is keyed as by key 23 so that sleeves 10, 18 and 22 all rotate together about the tool axis 13. The sleeve 18 also has a slot 23' formed therein whereby it may be axially positioned relative to outer sleeve 22. The outer sleeve or tool housing 22 includes at its upper end an adjustable cylindrical portion 24 which may be rotated relatively to the outer sleeve 22. Cylindrical portion 24 has an internally threaded portion 25 which engages with a threaded portion 26 on the sleeve 18. Rotation of cylindrical portion 24 relative to sleeve 18 causes the latter to be raised or lowered within sleeve 22 thus providing a means for adjusting the axial location of the groove to be formed by the tool of my invention in the part 40 to be machined as will be more fully described below.

The cutter of the grooving tool comprises a shank 25 and a cutting portion 26. The shank is adapted to be supported in a cutter holding member 27 which is journalled eccentrically within the outer sleeve or tool housing 22. At the upper end of holding member 27 is a radially extending slot 28 which is adapted to receive a pin 29 on a hub 15' secured to the lower end of the drive shaft 15. This pin and slot coupling connecting the lower end of the drive shaft 15 and the eccentrically mounted cutter holder effects rotation of the cutter about an axis 31 which is eccentric to the tool axis 13. A lipped bushing 32 contacting the upper surface of the hub 15' is provided for preventing relative axial movement between the cutter holder 27 and the lower end of the drive shaft 15.

Fixed to the lower end of outer sleeve 22 is a pilot member 33 which surrounds the shank portion of the cutter and which is provided at its lower end with a bearing surface 34 closely adjacent the cutting portion 26 of the cutter.

Figure 5:
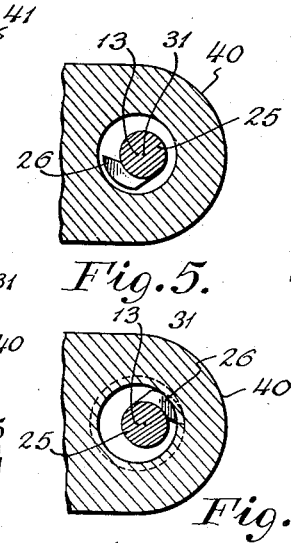

Fig. 5 illustrates the shape of the cutter. It will be noted that when the cutter 26 is in its retracted position, i. e., when the sleeve 10 is in the position shown in Fig. 1, the cutter rotates freely within the bore to be grooved.

In describing the operation of the grooving tool of my invention, it will be noted that in the illustrated embodiment it is desired to perform a grooving operation deep within a part 40 which has been suitably clamped in a drilling jig 41 having a suitable drilling bushing 42. It will also be noted that the work 40 need not be unclamped and removed from the drilling jig 40 and that, indeed, the drilling jig need not be moved on the table of the drill press. All that the operator needs to do is to remove the boring tool from the chuck 12 of the drill press and replace it with the grooving tool. Of course it is not necessary to use the drill jig 41, but instead it may be desired to pilot the tool directly into the work. Also, in performing a grooving operation at different axial locations along a bore at axial distances greater than the internal adjustment that the tool provides, it may be desirable to use bushings or collars made in various lengths or thicknesses. Also, in place of the collars, a thrust bearing may be added where direct contact of a non-rotating member is desired.

It will also be noted that the pilot member 33 is of the same diameter as the diameter of the boring tool and therefore may be easily inserted into the bushing 42 of the drill jig 41.

Figure 6:
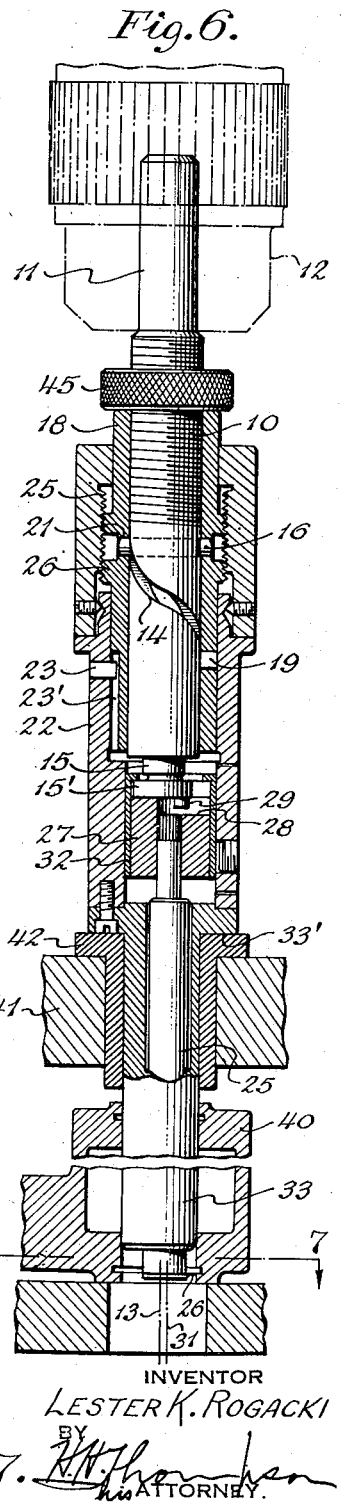
Fig. 6 is a vertical section of the tool of my invention partly in elevation during the cutting operation.
Figure 7:
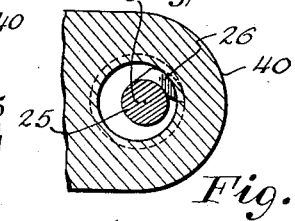
Fig. 7 is a longitudinal section taken at line 7—7 of Fig. 6.

As the drill press is lowered by the operator, the pilot member 33 is guided into the work 40 by the drill jig bushing 42 and such movement continues until the shoulder 33' of the pilot 33 abuts the upper surface of the drill bushing 42 at which point axial motion of the tool is stopped. At this time the cutting portion 26 is still in its receded or retracted position since there has been no rotation of the cutter about the eccentric axis 31. Continued downward motion of the drill press chuck causes the first cylindrical sleeve 10 to travel into the second sleeve 18 thereby causing drive shaft 15 to be rotated about the tool axis 13 through pin 16 and helical slot 14. This rotary motion of drive shaft 15 causes rotation of the cutter holder 27 and cutter 25—26 about the eccentric axis 31. This eccentric rotation causes the cutting portion 26 of the cutter to advance into the wall of the boring thereby forming the desired groove. The position of the various parts of the tool under this condition is shown in detail in Fig. 6 and the position of the cutter in Fig. 7.

The depth of the groove may be adjusted by adjusting the relative axial movement between the sleeve 10 and the sleeve 18. In other words, the depth of the groove may be adjusted by adjusting the amount of eccentric rotation of the cutter relative to the pilot member 33. For this purpose, the upper portion of the sleeve 10 is threaded and cooperating with this threaded portion is an internally threaded adjusting nut 45. Thus, when the sleeve 10 is lowered, the nut 55 will contact the upper surface of the sleeve 18 thereby limiting the axial movement of the sleeve 10 into the sleeve 18.

After the cut has been made, i .e., after the adjusting nut 45 has been brought into contact with the upper surface of the sleeve 18, the operator removes pressure on the drill press actuating handle and this removal of pressure will cause the spring 17 to force the sleeve 10 out of the sleeve 18 before it is possible to remove the tool from the drill jig 41. Of course this is necessary since the cutting portion 26 of the cutter must be withdrawn to its retracted position so that it will not score the work as the tool is removed therefrom.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A recessing tool of the character described comprising an inner cylindrical sleeve having a shank portion at its upper end whereby the tool is gripped and driven, said inner sleeve having a generally helical slot formed therein, a shaft slidably and rotatably fitted within said inner sleeve and having a projecting pin fixed adjacent to its upper end to engage within said slot whereby axial movement of said inner sleeve will effect rotary motion of said shaft relative to said inner sleeve, an outer sleeve keyed to said inner sleeve whereby both of said sleeves will rotate together, said outer sleeve having an annular internal groove therein adapted to receive the protruding end of said pin to thereby prevent relative axial movement of said shaft and said outer sleeve, a cutter having a cutting portion and a shank, a holder for said cutter eccentrically journalled within the lower portion of said outer sleeve including means for clamping the shank of said cutter therewithin, a pilot member fixed to the lower end of said outer sleeve and surrounding the shank of said cutter, said pilot member terminating closely adjacent the cutting portion of the cutter and being provided with a bearing for the shank thereof adjacent the cutting portion, and coupling means connecting the lower end of said shaft and the eccentrically mounted holder for said cutter for effecting rotation of said cutter relative to said pilot member.

2. An internal grooving tool comprising a first, cylindrical sleeve having a shank portion at its upper end whereby the tool is gripped and driven, said first sleeve having a generally helical slot formed therein, a shaft slidably and rotatably fitted within said first sleeve and having a projecting pin fixed adjacent to its upper end to engage within said slot whereby axial movement of said first sleeve will effect rotary motion of said shaft relative to said first sleeve, a second, concentric sleeve keyed to said first sleeve whereby said first and second sleeves will rotate together, said second sleeve having an annular, internal groove therein adapted to receive the protruding end of said pin to thereby prevent relative axial movement of said shaft and second sleeve, a third outer sleeve keyed to said second sleeve whereby said first, second and third sleeves will all rotate together, a cutter having a cutting portion and a shank, a holder for said cutter eccentrically journalled within the lower portion of said outer sleeve including means for clamping the shank of said cutter therewithin, a pilot member fixed to the lower end of said outer sleeve and surrounding the shank of said cutter, said pilot member terminating closely adjacent the cutting portion of the cutter and being provided with a bearing for the shank thereof adjacent the cutting portion, and coupling means connecting the lower end of said shaft and the eccentrically mounted holder for said cutter for effecting rotation of said cutter relative to said pilot member.

3. An internal grooving tool comprising a first, cylndrical sleeve having a shank portion at its upper end whereby the tool is gripped and driven, said first sleeve having a generally helical slot formed therein, a shaft slidably and rotatably fitted within said first sleeve and having a projecting pin fixed to its upper end to engage within said slot whereby axial movement of said first sleeve will effect rotary motion of said shaft relative to said first sleeve, a second concentric sleeve keyed to said first sleeve whereby said first and second sleeves will rotate together, said second sleeve having an annular, internal groove therein adapted to receive the protruding end of said pin to thereby prevent relative axial movement of said shaft and second sleeve, a third outer sleeve keyed to said second sleeve whereby said first, second and third sleeves will all rotate together, a cutter having a cutting portion and a shank, a holder for said cutter eccentrically journalled within the lower portion of said outer sleeve including means for clamping the shank of said cutter therewithin, a pilot member fixed to the lower end of said outer sleeve and surrounding the shank of said cutter, said pilot member terminating closely adjacent the cutting portion of the cutter and being provided with a bearing for the shank thereof adjacent the cutting portion, a pin and slot coupling connecting the lower end of said shaft and the eccentrically mounted holder for effecting rotation of said cutter relative to said pilot member.

4. An internal grooving tool comprising a first, cylindrical sleeve having a shank portion at its upper end whereby the tool is gripped and driven, said first sleeve having a generally helical slot formed therein, a shaft slidably and rotatably fitted within said first sleeve and having a projecting pin fixed adjacent to its upper end to engage within said slot whereby axial movement of said first sleeve will effect rotary motion of said shaft relative to said first sleeve, a second, concentric sleeve keyed to said first sleeve whereby said first and second sleeves will rotate together, said second sleeve having an annular, internal groove therein adapted to receive the protruding end of said pin to thereby prevent relative axial movement of said shaft and second sleeve, a third outer sleeve keyed to said second sleeve whereby said first, second and third sleeves will all rotate together, a cutter having a cutting portion and a shank, a holder for said cutter eccentrically journalled within the lower portion of said outer sleeve including means for clamping the shank of said cutter therewithin, a pilot member fixed to the lower end of said outer sleeve and surrounding the shank of said cutter, said pilot member terminating closely adjacent the cutting portion of the cutter and being provided with a bearing for the shank thereof adjacent the cutting portion, coupling means connectiing the lower end of said shaft and the eccentrically mounted holder for said cutter for effecting rotation of said cutter relative to said pilot member, and means for adjusting the axial position of said second sleeve relative to said outer sleeve whereby to adjust the axial position of the cutting portion of said cutter relative to the lower portion of said pilot member.

5. An internal grooving tool comprising a first, cylindrical sleeve having a shank portion at its upper end whereby the tool is gripped and driven, said first sleeve having a generally helical slot formed therein, a shaft slidably and rotatably fitted within said first sleeve and having a projecting pin fixed adjacent to its upper end to engage within said slot whereby axial movement of said first sleeve will effecte rotary motion of said shaft relative to said first sleeve, a second concentric sleeve keyed to said first sleeve whereby said first and second sleeves will rotate together, said second sleeve having an annular internal groove therein adapted to receive the protruding end of said pin to thereby prevent relative axial movement of said shaft and second sleeve, a third outer sleeve keyed to said second sleeve whereby said first, second and third sleeves will all rotate together, a cutter having a cutting portion and a shank, a holder for said cutter eccentrically journalled within the lower portion of said outer sleeve including means for clamping the shank of said cutter therewithin, a pilot member fixed to the lower end of said outer sleeve and surrounding the shank of said cutter, said pilot member terminating closely adjacent the cutting portion of the cutter and being provided with a bearing for the shank thereof adjacent the cutting portion, coupling means connecting the lower end of said shaft and the eccentrically mounted holder for said cutter for effecting rotation of said cutter relative to said cutter relative to said pilot member, and means adjustably mounted on said first sleeve and cooperable with said second sleeve for adjusting the relative axial movement therebetween, whereby to adjust the relative eccentric rotation of said cutter and said pilot member.

6. An internal grooving tool comprising a first, cylindrical sleeve having a shank portion at its upper end whereby the tool is gripped and driven, said first sleeve having a generally helical slot formed therein, a shaft slidably and rotatably fitted within said first sleeve and having a projecting pin fixed adjacent to its upper end to engage within said slot whereby axial movement of said first sleeve will effect rotary motion of said shaft relative to said first sleeve, a second, concentric sleeve keyed to said first sleeve whereby said first and second sleeves will rotate together, said second sleeve having an annular, internal groove therein adapted to receive the protruding end of said pin to thereby prevent relative axial movement of said shaft and second sleeve, a third outer sleeve keyed to said second whereby said first, second and third sleeves will all rotate together, a cutter having a cutting portion and a shank, a holder for said cutter eccentrically journalled within the lower portion of said outer sleeve including means for clamping the shank of said cutter therewithin, a pilot member fixed to the lower end of said outer sleeve and surrounding the shank of said cutter, said pilot member terminating closely adjacent the cutting portion of the cutter and being provided with a bearing for the shank thereof adjacent the cutting portion, coupling means connecting the lower end of said shaft and the eccentrically mounted holder for said cutter for effecting rotation of said cutter relative to said pilot member, means for adjusting the axial position of second sleeve relative to said outer sleeve whereby to adjust the axial position of the cutting portion of said cutter relative to the lower portion of said pilot member, and means adjustably mounted on said first sleeve and cooperable with said second sleeve for adjusting the relative axial movement therebetween whereby to adjust the relative eccentric rotation of said cutter and said pilot member.

7. An internal grooving tool comprising a first, cylindrical sleeve having a shank portion at its upper end whereby the tool is gripped and driven, said first sleeve having a generally helical slot formed therein, a shaft slidably and rotatably fitted within said first sleeve and having a projecting pin fixed adjacent to its upper end to engage within said slot whereby axial movement of said first sleeve will effect rotary motion of said shaft relative to said first sleeve, a second, concentric sleeve keyed to said first sleeve whereby said first and second sleeves will rotate together, said second sleeve having an annular, internal groove therein adapted to receive the protruding end of said pin to thereby prevent relative axial movement of said shaft and second sleeve, a third outer sleeve keyed to said second sleeve whereby said first, second and third sleeves will all rotate together, a cutter having a cutting portion and a shank, a holder for said cutter eccentrically journalled within the lower portion of said outer sleeve including means for clamping the shank of said cutter therewithin, a pilot member fixed to the lower end of said outer sleeve and surrounding the shank of said cutter, said pilot member terminating closely adjacent the cutting portion of the cutter and being provided with a bearing for the shank thereof adjacent the cutting portion, coupling means connecting the lower end of said shaft and the eccentrically mounted holder for said cutter for effecting rotation of said cutter relative to said pilot member, means for adjusting the axial position of said second sleeve relative to said outer sleeve whereby to adjust the axial position of the cutting portion of said cutter relative to the lower portion of said pilot member, means adjustably mounted on said first sleeve and cooperable with said second sleeve for adjusting the relative axial movement therebetween whereby to adjust the relative eccentric rotation of said cutter and said pilot member, and a compression spring between said first sleeve and said shaft for returning said first sleeve to its neutral position upon axial movement thereof.

LESTER K. ROGACKI.

No references cited.